(12) United States Patent
Chang

(10) Patent No.: US 7,478,125 B2
(45) Date of Patent: Jan. 13, 2009

(54) AUTOMATIC ANNOTATION OF AUDIO AND/OR VISUAL DATA

(75) Inventor: Sam M. Chang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 705 days.

(21) Appl. No.: 09/952,295

(22) Filed: Sep. 13, 2001

(65) Prior Publication Data

US 2003/0050982 A1    Mar. 13, 2003

(51) Int. Cl.
*G06F 15/16* (2006.01)
*G06F 3/00* (2006.01)
*G06F 9/44* (2006.01)
*G06F 17/30* (2006.01)

(52) U.S. Cl. ............... 709/204; 709/217; 709/230; 719/318; 707/1; 707/200

(58) Field of Classification Search ........... 709/203, 709/204, 217, 230; 719/318; 707/1, 200
See application file for complete search history.

(56) References Cited

U.S. PATENT DOCUMENTS

| | | | | |
|---|---|---|---|---|
| 5,247,438 A | * | 9/1993 | Subas et al. ............... 700/90 |
| 5,857,708 A | * | 1/1999 | Harvey ...................... 283/67 |
| 6,393,431 B1 | * | 5/2002 | Salvati et al. ........... 707/104.1 |
| 6,480,830 B1 | * | 11/2002 | Ford et al. .................. 705/9 |
| 6,487,585 B1 | * | 11/2002 | Yurkovic ................. 709/206 |
| 6,640,230 B1 | * | 10/2003 | Alexander et al. ......... 707/10 |
| 6,675,356 B1 | * | 1/2004 | Adler et al. ............... 715/530 |
| 6,751,626 B2 | * | 6/2004 | Brown et al. ............. 707/101 |
| 6,771,886 B1 | * | 8/2004 | Mendelsohn ............. 386/83 |
| 6,785,680 B1 | * | 8/2004 | Cragun ..................... 707/10 |
| 6,957,235 B2 | * | 10/2005 | Peairs et al. ............. 707/204 |
| 2002/0116221 A1 | * | 8/2002 | Fields et al. ............... 705/2 |

* cited by examiner

*Primary Examiner*—Ario Etienne
*Assistant Examiner*—Avi Gold
(74) *Attorney, Agent, or Firm*—Blakely, Sokoloff, Taylor & Zafman LLP

(57) ABSTRACT

Automatic annotation of data recorded by a device. A portion of an event may be recorded as an image, movie, sound byte, audio recording, etc., and contemporaneous to the recording, a time value (which may encode a calendar date) is determined. The time value is looked up on a calendar, and a description of the event is read from the calendar and used to automatically annotate the recording.

16 Claims, 4 Drawing Sheets

AUTOMATIC ANNOTATION OF AUDIO AND/OR VISUAL DATA

FIELD OF THE INVENTION

The invention generally relates to annotating recorded data, and more particularly to automatically annotating audio and/or visual data recordings based at least in part on a timing indicator.

BACKGROUND

Recent advances in recording, storage and form factor technology have resulted in proliferation of personal data and media recording devices, such as personal video cameras, photo cameras, audio recorders, etc. However, incident to such proliferation is tracking problem inherent to cross-referencing recordings with the environment in which the recording was taken. This problem is especially applicable to storage media having large storage capacity, e.g., capacity to store thousands of images, many hours of video recordings, tens of thousands of music recordings, etc., it becomes a near insurmountable problem to accurately and consistently annotate recorded data with information to identify the context for the recorded data.

It is increasingly difficult to simply label storage devices with all of the data content therein, as historically has been done, e.g., labeling a tape cassette or a video cassette recorder cartridge. And, with the ability to easily replace some or all of a storage device's content, even with an ability to label the storage device, such labeling may quickly become stale.

BRIEF DESCRIPTION OF THE DRAWINGS

The features and advantages of the present invention will become apparent from the following detailed description of the present invention in which.

DETAILED DESCRIPTION

Figure 1:
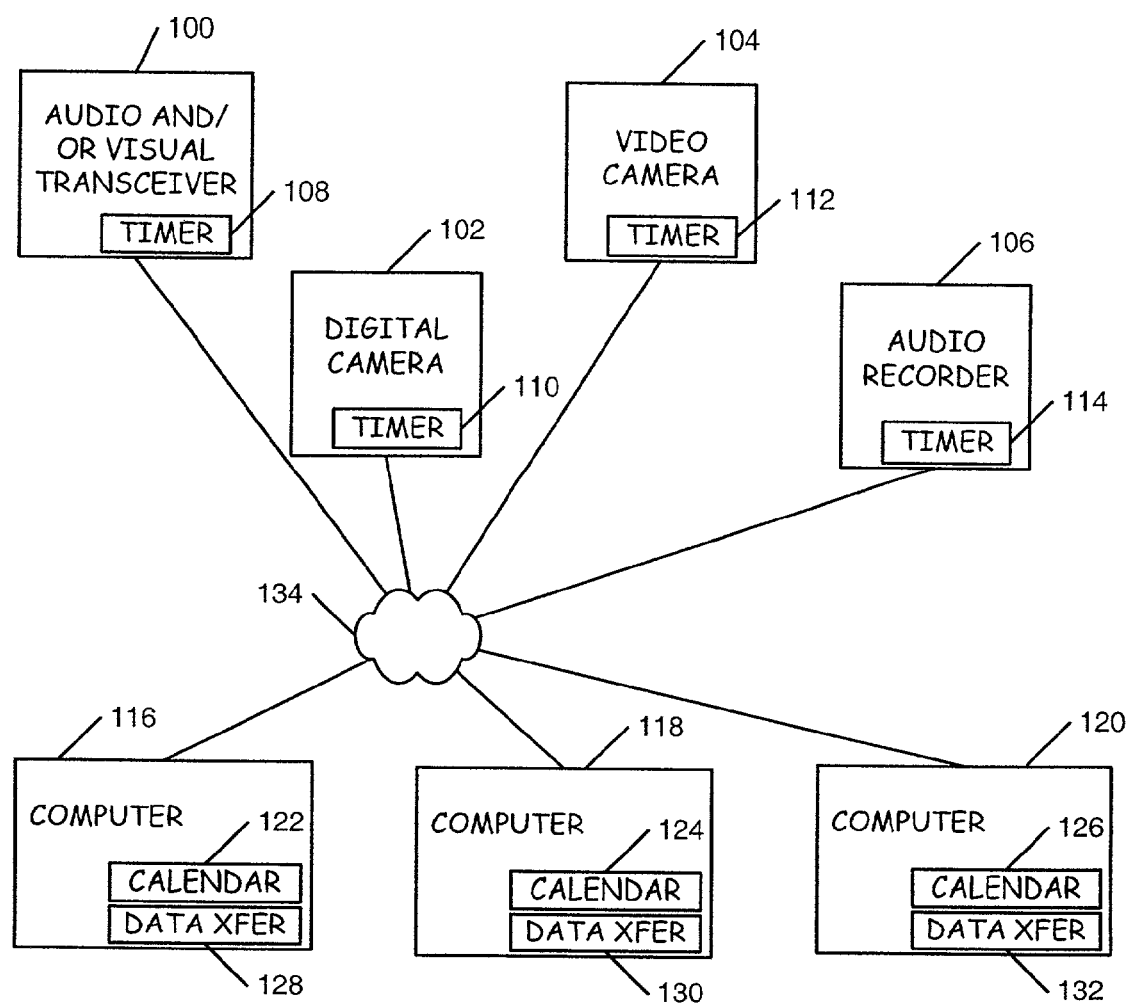
FIG. 1 illustrates an exemplary system incorporating the invention.

FIG. 1 illustrates an exemplary system incorporating the invention. Illustrated are an audio and/or visual transceiver 100, such as a cellular telephone configured to transmit audio and/or visual data, a digital camera 102, a video camera 104, an audio recorder 106. It will be appreciated by one skilled in the art that the illustrated devices 100-104 are exemplary devices, and that other devices may be utilized.

Associated with each of these devices are timers 108, 110, 112, 114. The timers may be integral to the devices 100-104 as illustrated, or they may represent timing functionality or circuitry that receives timing data from an external source. For example, the digital camera 102 may have a receiver capable of receiving timing data originating from an external source, such as the United States Naval Observatory's Master Clock (USNO), the Time and Frequency Division of the National Institute of Standards and Technology (NIST), or another clock source. To allow coordination of activity between devices 100-104, devices 100-104 may be configured to use the same timing source. In one embodiment, calendar date values may be determined from timing values. For example, a timing value may represent the number of seconds since a particular date.

Also illustrated are machines 116, 118, and 120, which may be personal computers, personal digital assistants, or other machines. Each of the machines 116-120 are configured to operate a calendar application 122, 124, 126 (or other application associating events and times), and a data transfer application 128, 130, 132 such as electronic mail (E-mail) program, instant messaging system or other data transfer ability. The audio and/or visual transceiver, digital camera, video camera and audio recorder are assumed to have a wired and/or wireless communication link 134 to some or all of the machines 116, 118, and 120, by way of a network or other communication technology.

As will be described further with respect to FIG. 2, when a device 100-106 records data, a time stamp from an appropriate timing device 108-114 is associated with the recording. This associated time stamp is then compared against one or more calendars 122-126 to identify a context for the recording. In one embodiment, if a calendar indicates one or more related entities, e.g., persons listed in a calendar entry, or based on some other cross-reference, then related entities may be provided with a copy of the recording by way of the data transfer application 128-132.

Figure 2:
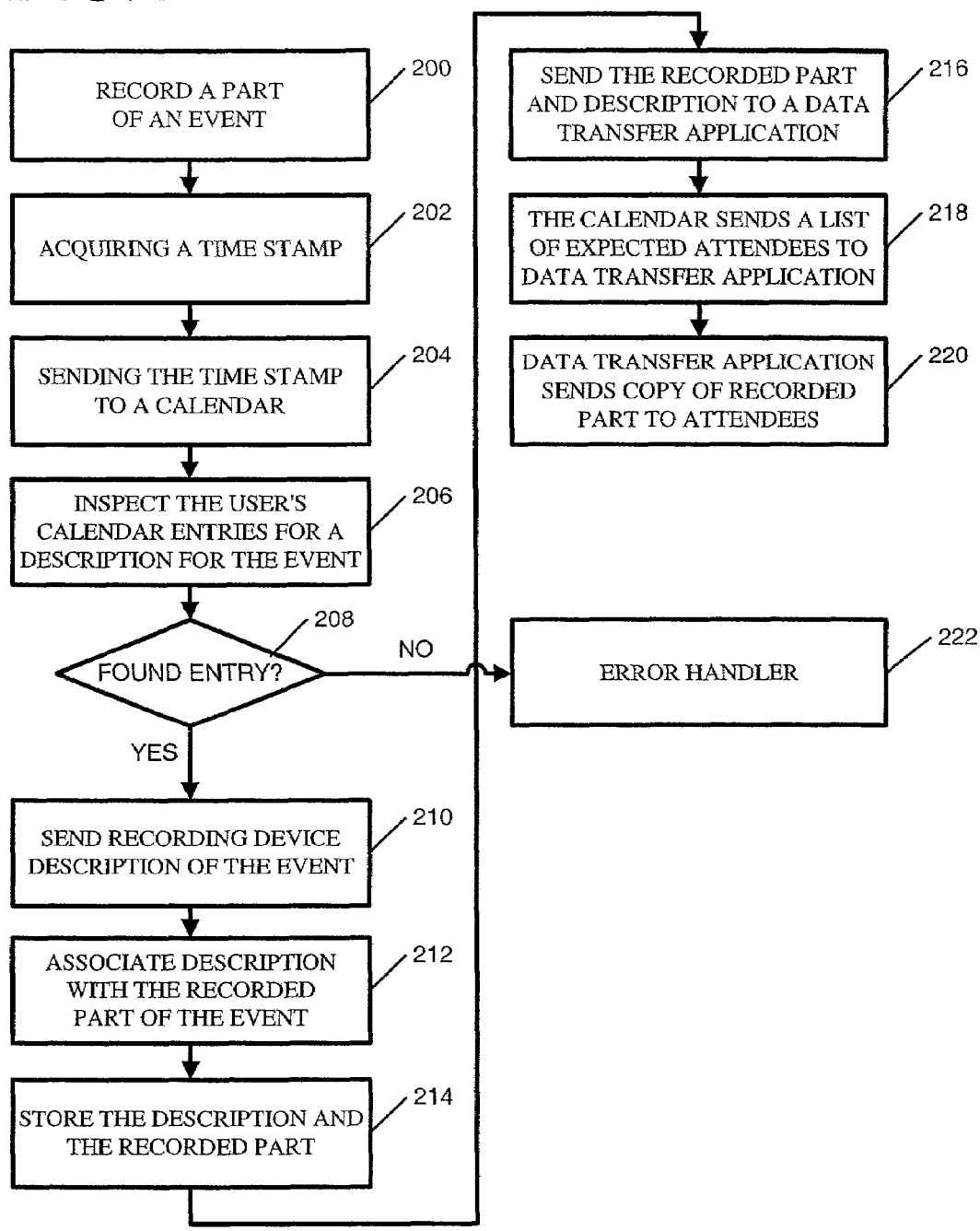
FIG. 2 is a flowchart according to one embodiment of the invention for recording an event and providing the recording to other event attendees.

FIG. 2 is a flowchart according to one embodiment of the invention for recording 200 a part (or portion) of an event, such as with a audio and/or visual transceiver (e.g., a cellular telephone, video phone, etc.), video camera, or other device configured to record into local or remote storage, and providing the recording to other event attendees.

A time stamp is acquired 202, such as from an internal clock, or external reference source. The time stamp information is sent 204 to a calendar system along with at least an identifier of the user of the recording device. The calendar system may be any conventional or proprietary calendar, e.g., personal, corporate, general, etc. calendar, such as the Outlook calendar program provided by Microsoft Corporation of Redmond Wash., database application, or other application program that may associate time stamps with events (hereafter generally "calendar"). The user's identifier may be pre-associated with the user, temporarily associated, or prompted for during the recording process. It is assumed that an appropriate communication protocol or Application Programming Interface (API) is known to the recording device, thus allowing the recording device to communicate with the calendar irrespective of the particular characteristics or nature of the calendar.

In response to sending the time stamp information, the calendar inspects 206 the user's calendar to see what is on the calendar for the given time stamp information. If 208 an event is on the calendar for the time stamp information, the calendar sends 210 back to the recording device a description of an event. For example, the identified user may have a calendar entry indicating that the user is attending a social gathering for the user's work group. This description of the get together is sent 210 back to the recording device. The recording device can associate 212 the description with the recorded 200 part of the event, and store 214 the description and recorded part of the event in a data storage communicatively coupled to the recording device, e.g., in a local attached storage, wirelessly accessible remote storage, or the like. If 208 no entry is found, then an error handler 222 may be invoked, or a default description used for the event.

In one embodiment, the description is embedded within the recorded part of the event. For example, the event may be recorded with an Exchangeable Image File (EXIF) format, which is a standard format for storing information within digital photography image files using JPEG compression, in the DIG35, promulgated by the Digital Imaging consortium (see http://www-digitalimaging-org), in the graphics interchange format (GIF), or other data format providing for embedding data within the recorded part of the event. (To prevent inadvertent hyperlinks, the periods in the preceding Uniform Resource Locator (URL) were replaced with hyphens.) In one embodiment, data may be associated with the recorded part of the event to facilitate archiving, indexing, cataloging, cross-referencing, reviewing, and retrieving recordings.

In one embodiment, the recording device sends 216 the recorded part of the event, and associated description received from the calendar system, to a data transfer application program such as an E-mail program. In this embodiment, the calendar system also sends 218 the data transfer application program a list of other event attendees. It will be appreciated that various techniques may be used to identify event attendees. In one embodiment, the calendar sends a list of expected attendees, e.g., invitees, and it is later determined which attendees actually attended the event.

For example, the calendar for the user of the recording device may directly reference other attendees, such as by way of a meeting request that was used to schedule the event. All invited attendees, or perhaps just a subset, such as those meeting some criteria, are used to define the list of other event attendees. For example, the list of event attendees might only include those attendees that accepted the meeting request, or those attendees that have a special status indicating they should be included in the list irrespective of having accepted the invitation.

In one embodiment, if the calendar does not identify other event attendees, other calendars, perhaps based on a social or business structure, may be searched to determine whether a user corresponding to the searched calendar should be in the list of attendees. For example, all calendars for people in the user's work group might be searched for corresponding entries for the event. It will be appreciated that matching algorithms may be employed to compensate for manually written calendar entries for the event.

The data transfer program, having received the recorded part of the event, associated description, and the list of other event attendees, sends 220 each attendee a copy of the recorded part of the event. In one embodiment in which the data transfer program is an E-mail program, the subject and/or message body of the E-mail message sent to attendees comprises the associated description. The subject of the E-mail message, or message body, may also comprise statements reflecting the status of the attendee. For example, if a recipient did not attend the event, a standard message body might state "Sorry you could not make it to the event, but here is a recording of the event!" Similarly, other messages or graphics may be sent within a message for attendees that accepted but did not go, did not accept but went anyway, etc.

In one embodiment, categories and/or user preferences may alter distribution of data to attendees. For example, for certain events, such as holiday gatherings or birthdays, everyone in a work group, social group, etc. may automatically receive the recording of the event irrespective of whether they attended the event. However, user preferences may be used to override sending such messages.

Figure 3:
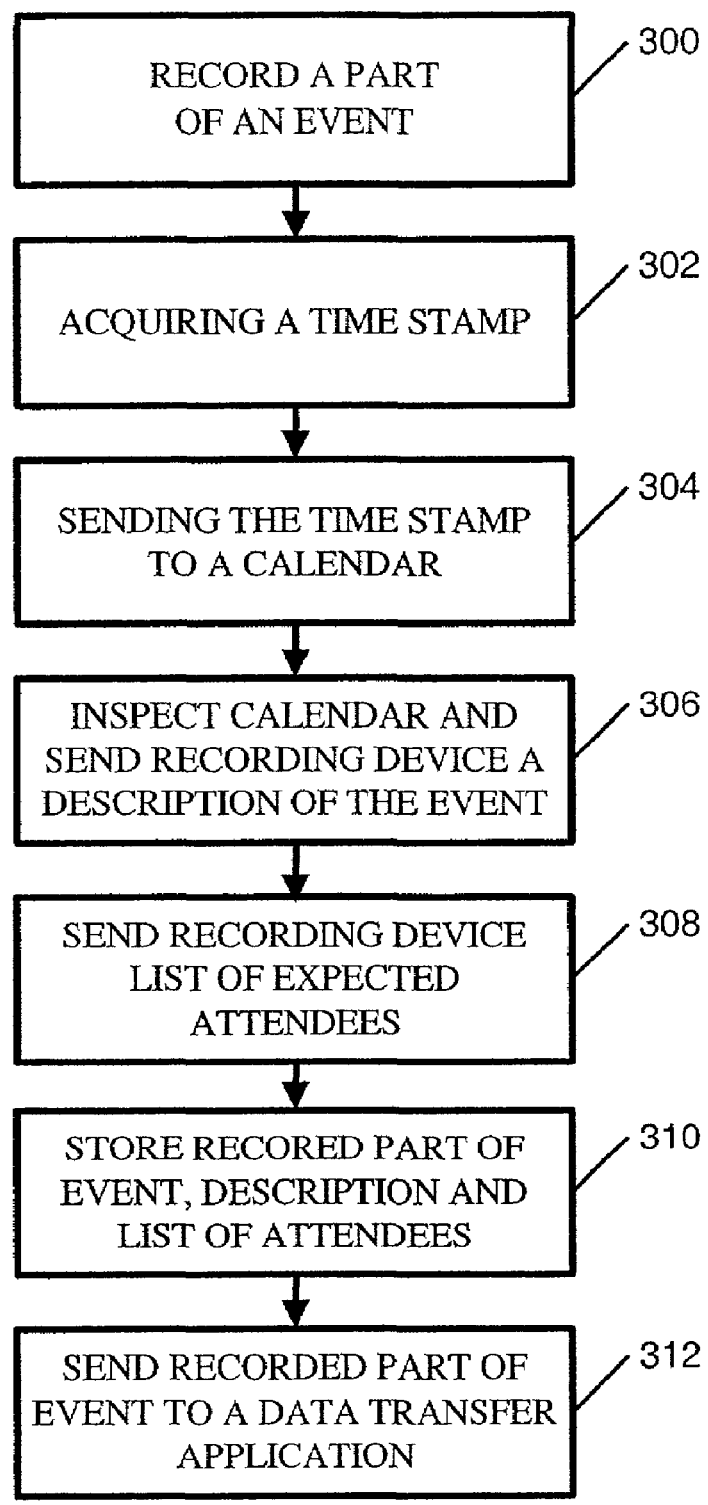
FIG. 3 is a flowchart for a variation of the FIG. 2 embodiment.

FIG. 3 illustrates a flowchart according to another embodiment of the invention. In this embodiment, as with FIG. 2, a recording device records 300 part of the event. A time stamp is acquired 302, sent 304 to a calendar system along with an identifier of the user of the recording device, and in response the calendar system sends 306 back to the recording device a description of an event, if any. However, in this embodiment, 1t and in contrast with FIG. 2, the calendar system also sends 308 the recording device a list of event attendees. As discussed above for FIG. 2, the list of attendees may be determined in various ways, e.g., based on attendees expected (invitees), attendees actually attending the event, based on status of attendee, etc.

The recording device can then store 310 the recorded 300 part of the event along with the description of the event, and the list of event attendees in a data storage communicatively coupled to the recording device, as well as send 312 the recorded part of the event, description, and list attendees to a data transfer program for distribution to event attendees. Thus, in this embodiment, the data transfer program need only communicate with the recording device in order to transfer event recordings to attendees. It will be appreciated that other communication configurations may be used, such as using a central repository for recorded parts of events and associated event attendees, where the transfer program retrieves recording and attendees from the central repository.

Figure 4:
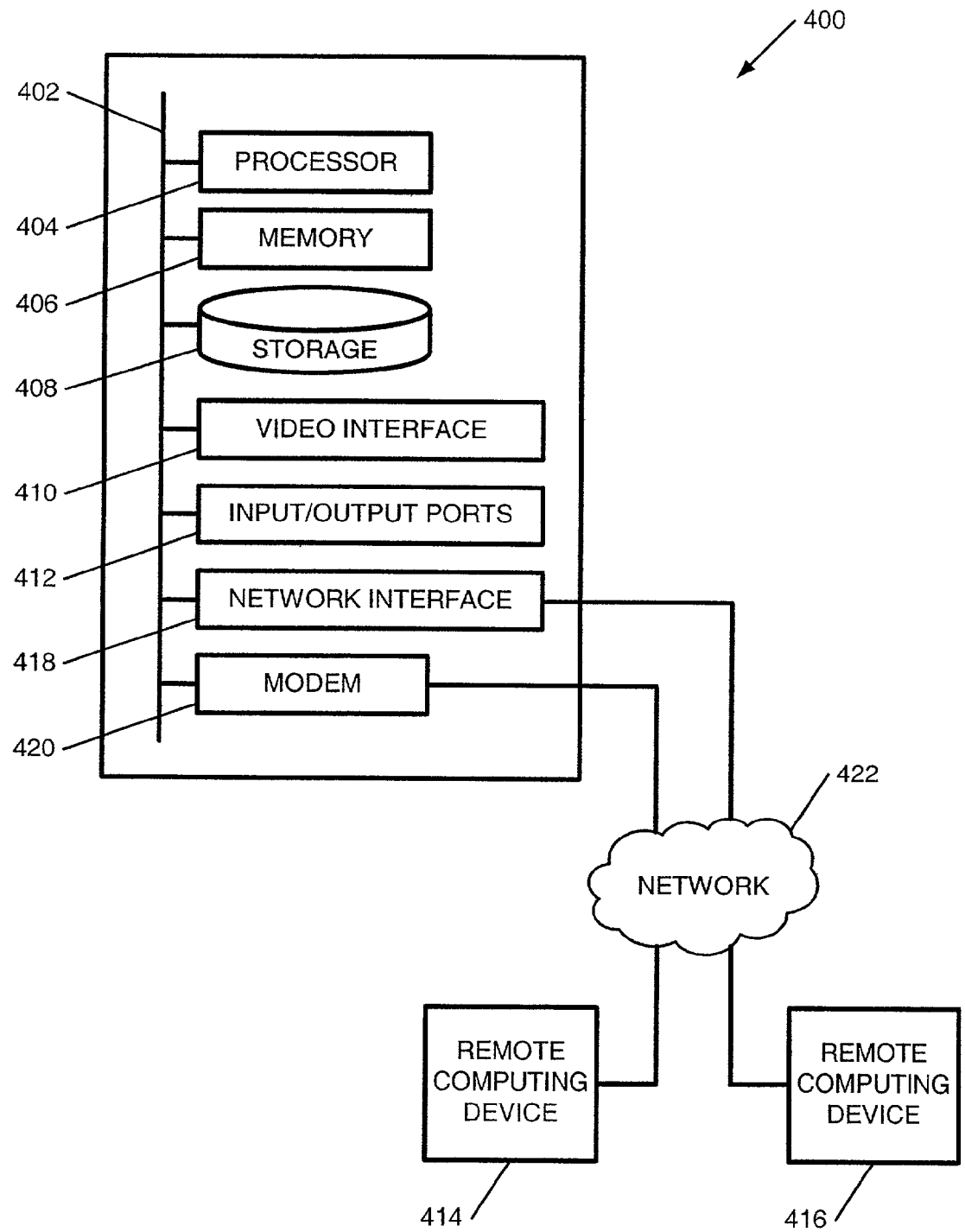
FIG. 4 illustrates a suitable computing environment in which certain aspects of the invention may be implemented.

FIG. 4 and the following discussion are intended to provide a brief, general description of a suitable computing environment in which certain aspects of the illustrated invention may be implemented. An exemplary system for embodying, for example, the digital camera 102 or machines 116, 118, and 120 of FIG. 1, includes a machine 400 having system bus 402 for coupling various machine components. Typically, attached to the bus are processors 404, a memory 406 (e.g., RAM, ROM), storage devices 408, a video interface 410, and input/output interface ports 412.

The system may also include embedded controllers, such as Generic or Programmable Logic Devices or Arrays (PLD, PLA, GAL, PAL), Field-Programmable Gate Arrays (FPGA), Application Specific Integrated Circuits (ASIC), single-chip computers, smart cards, or the like, and the system is expected to operate in a networked environment using physical and/or logical connections to one or more remote systems 414, 416 through a network interface 418, modem 420, or other pathway. Systems may be interconnected by way of a wired or wireless network 422, including an intranet, the Internet, local area networks, wide area networks, cellular, cable, laser, satellite, microwave, "Blue Tooth" type networks, optical, infrared, or other carrier.

The invention may be described by reference to program modules for performing tasks or implementing abstract data types, e.g., procedures, functions, data structures, application programs, etc., that may be stored in memory 406 and/or storage devices 408 and associated storage media, e.g., hard-drives, floppy-disks, optical storage, magnetic cassettes, tapes, flash memory cards, memory sticks, digital video disks or biological storage.

Illustrated methods and corresponding written descriptions are intended to illustrate machine-accessible media storing directives, or the like, which may be incorporated into single and multi-processor machines, portable computers, such as handheld devices including Personal Digital Assistants (PDAs), cellular telephones, etc. An artisan will recognize that program modules may be high-level programming language constructs, or low-level hardware instructions and/or contexts, that may be utilized in a compressed or encrypted format, and may be used in a distributed network environment and stored in local and/or remote memory.

Thus, for example, with respect to the illustrated embodiments, assuming machine 400 operates as a recording device for an event, then remote devices 414, 416 may respectively be a machine operating a calendar for a user of the recording device, and an a remote clock source to identify when the recording device was operating. It will be appreciated that remote machines 414, 416 may be configured like machine 400, and therefore include many or all of the elements discussed for machine. It should also be appreciated that machines 400, 414, 416 may be embodied within a single device, or separate communicatively-coupled components.

Having described and illustrated the principles of the invention with reference to illustrated embodiments, it will be recognized that the illustrated embodiments can be modified in arrangement and detail without departing from such principles. And, even though the foregoing discussion has focused on particular embodiments, it is understood other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments, and unless indicated otherwise, embodiments are combinable into other embodiments.

Consequently, in view of the wide variety of permutations to the above-described embodiments, the detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for annotating recorded data, comprising:
    generating a multimedia recording of a portion of an event with a recording device;
    determining, contemporaneous to the recording and with the recording device, a time when the recording occurred;
    providing, with the recording device, the time to a calendar application configured to look up a description of the event within the calendar based at least in part on the time when the recording occurred;
    receiving, with the recording device, from the calendar a description of the event that includes at least an indication of expected attendees of the event and an indication of actual attendees of the event;
    providing, with the recording device to an electronic message communication application, the recording of the event, the indication of expected attendees of the event and the indication of actual attendees of the event;
    providing a copy of the recording of the event and a first message to actual attendees of the event with the electronic message communication application; and
    providing a copy of the recording of the event and a second message to invited attendees of the event that did not actually attend the event with the electronic message communication application.

2. The method of claim 1, further comprising:
    providing an identifier for a user to the calendar, wherein the calendar looks up the description of the event based at least in part on the identifier and the time.

3. The method of claim 1, wherein the electronic message communication application is an E-mail program.

4. The method of claim 1, wherein the user is using the recording device.

5. The method of claim 1, wherein the determining the time comprises:
    contacting a time provider external to the recording device.

6. A method, comprising:
    recording a portion of an event with a recording device associated with a user;
    determining a time when the recording occurred with the recording device;
    sending a request to a calendar of the user with the recording device;
    receiving from the calendar with the recording device, responsive to the request, a description of the event, and a list of expected attendees for the event; and
    providing the recorded portion of the event, the description, and the list of expected attendees to a data transfer device for delivery of the recorded portion to selected ones of the attendees of the list of expected attendees, wherein selected ones of the attendees of the list comprise providing a copy of the recording of the event and a first message to invited attendees of the event that did not actually attend the event and providing a copy of the recording of the event and a second message to actual attendees of the event.

7. An article, comprising:
    a machine-accessible media having associated data, wherein the data, when accessed, results in a machine performing:
    recording a portion of an event with the recording device;
    determining, with the recording device contemporaneous to the recording, a time when the recording occurred;
    providing with the recording device, the time to a calendar configured to look up a description of the event within the calendar based at least in part on the time when the recording occurred;
    receiving from the calendar a description of the event
    providing a copy of the recording of the event and a first message to actual attendees of the event with the electronic message communication application; and
    providing a copy of the recording of the event and a second message to invited attendees of the event that did not actually attend the event with the electronic message communication application.

8. The article of claim 7 wherein the machine-accessible media further includes data, when accessed by the machine, results in the machine performing:
    providing an identifier for a user to the calendar, wherein the calendar looks up the description of the event based at least in part on the identifier and the time.

9. The article of claim 7 wherein the machine-accessible media further includes data, when accessed by the machine, results in the machine performing:
    determining attendees of the event; and
    transferring to the attendees data comprising a recorded portion of the event and the description of the event.

10. The article of claim 7 wherein the machine-accessible media further includes data, when accessed by the machine, results in the machine performing:
    providing the description and a recorded portion of the event to a data transfer application program.

11. The article of claim 10, wherein the electronic message communication application is an E-mail program.

12. The article of claim 7, wherein the user is using the recording device.

13. The article of claim 7 wherein the data in the machine-accessible media for determining the time further includes data, which when accessed by the machine, results in the machine performing:
    contacting a time provider external to the recording device.

14. The article of claim 7 wherein the machine-accessible media further includes data, when accessed by the machine, results in the machine performing:
   instructing the data transfer device to only deliver the recorded portion of the event to those attendees actually attending the event.

15. An article, comprising:
   a machine-accessible media having associated data, wherein the data, when accessed, results in a machine performing:
      recording a portion of an event with a recording device associated with a user;
      determining a time when the recording occurred;
      sending a request to a calendar of the user;
      receiving from the calendar, responsive to the request, a description of the event, and a list of expected attendees for the event; and
      providing a copy of the recording of the event and a first message to actual attendees of the event with the electronic message communication application; and
      providing a copy of the recording of the event and a second message to invited attendees of the event that did not actually attend the event with the electronic message communication application.

16. The article of claim 15 wherein the machine-accessible media further includes data, when accessed by the machine, results in the machine performing:
   identifying an attendee in the list of expected attendees that did not attend the event but that has a special status; and
   delivering the recorded portion of the event to the attendee having the special status.

* * * * *